Jan. 13, 1959

M. DODGE 2,868,202

INFANT FEEDING DEVICE

Filed Sept. 24, 1956

INVENTOR.
Milton Dodge
BY
ATTORNEY.

United States Patent Office 2,868,202
Patented Jan. 13, 1959

2,868,202
INFANT FEEDING DEVICE

Milton Dodge, Kansas City, Mo., assignor of one-half to Abe Okrend, Kansas City, Mo.

Application September 24, 1956, Serial No. 611,416

3 Claims. (Cl. 128—252)

This invention relates to a utensil particularly adapted for use in the feeding of infants.

It is the primary object of the instant invention to provide a spoon-like infant feeding device having a nipple on the bowl thereof through which food may be drawn by the infant from the bowl in much the same way as an ordinary nipple is used in connection with a bottle in the usual manner.

Another important object of the present invention is to provide an infant feeding device having a handle provided with a bowl integral with one end thereof preferably of a spherical shape to contain food that is to be consumed by the infant through the medium of a nipple that extends from the bowl in diametrically opposed relationship to the handle.

Another important object of the present invention is to provide a feeding device for infants that may be filled either by pouring the food into the bowl prior to use by the infant, or be employed in the manner of a ladle to scoop the food from a pan or other container therefor.

A further object of the instant invention is to provide an infant feeding device having a slit formed in the nipple thereof whereby to permit feeding of soupy, slurry liquids.

A still further object of the present invention is to provide an infant feeding device that is self-supporting on a flat surface in a manner to prevent spilling of the contents of the bowl and to maintain the nipple out of contact with the supporting surface.

Figure 1:
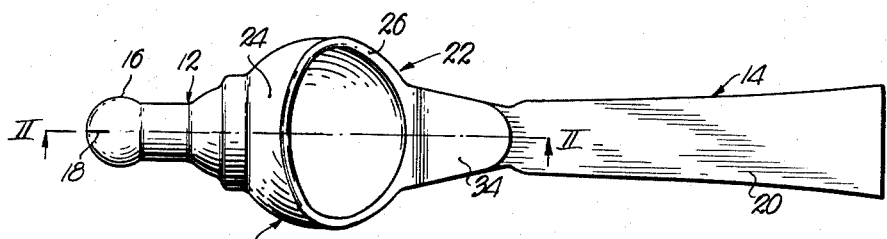
Figure 1 is a plan view of an infant feeding device made pursuant to my present invention.

This is a continuation-in-part of my copending application Serial No. 577,049, filed April 9, 1956.

It is to be preferred that the entire infant feeding device illustrated in the drawing be made from a suitable flexible material such as rubber or any one of a number of synthetics readily available on the open market. To this end there is provided three component parts all integrally interconnected and consisting of a bowl 10, a nipple 12, and a handle 14.

Figure 4:
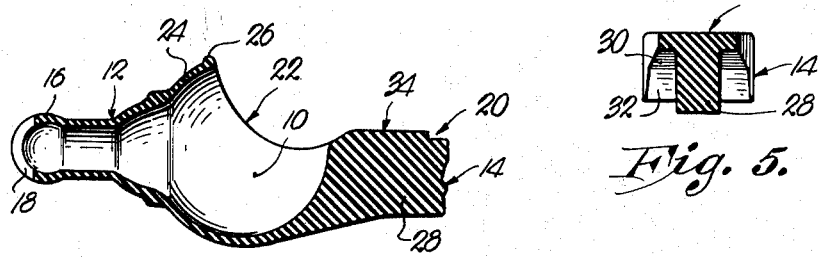
Fig. 4 is a fragmentary, longitudinal, cross-sectional view.

The bowl 10 is hollow and preferably spherical. The handle 14 and the nipple 12 extend from the bowl 10 in diametrically-opposed relationship. As seen in Fig. 4 of the drawing, the elongated nipple 12 is tubular and provided with a terminal end 16 having a discharge orifice in the nature of a slit 18. The innermost end of the nipple 12 communicates directly with the bowl 10.

The handle 14 has a flat uppermost surface 20, and an opening 22 within the bowl 10 is disposed next adjacent the said surface 20 of the handle 14. Nipple 12 on the other hand, is disposed below the opening 22 presenting an overhanging hood 24 forming a part of the bowl 10 and disposed between the opening 22 and the nipple 12. The bowl 10 is preferably reinforced and protected at the edge thereof forming opening 22 by a bead 26 integral with the bowl 10.

Figure 5:
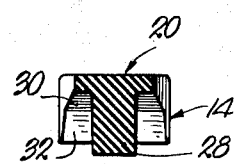
Fig. 5 is a detailed cross-sectional view taken on line V—V of Fig. 2.

The handle 14 is stiffened and reinforced by a longitudinal rib 28 on the lower face 30, rendering the said handle 14 substantially T-shaped in transverse cross-section as seen in Fig. 5. The rib 28 joins at its innermost end integrally with the bowl 10 thereby strengthening the latter and reinforcing the joinder between the handle 14 and the bowl 10. A downturned flange 32 at the outermost end of the handle 14 integral therewith, merges with the outermost end of the rib 28.

Figure 2:
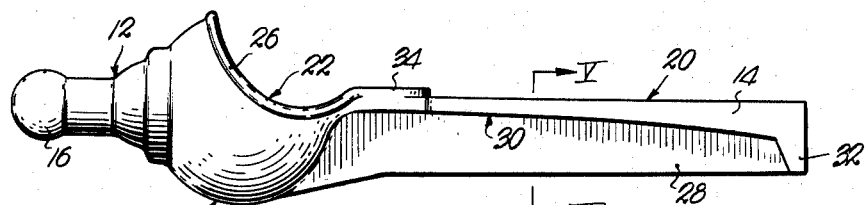
Fig. 2 is a side elevational view thereof.
Figure 3:
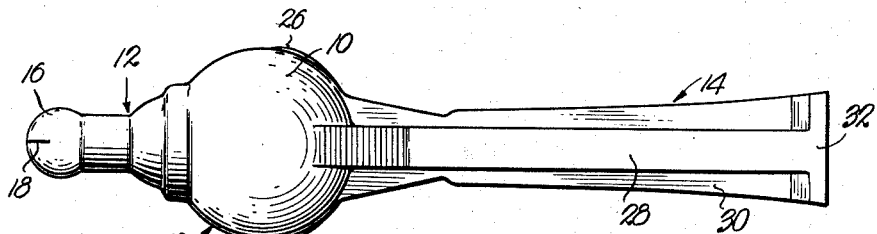
Fig. 3 is a bottom plan view of the device.

The flat, transversely extending, lowermost face of the lip 32 presents a support for the device when the same is placed on a flat surface such as a table-top and when the lip 32, together with the lowermost spherical surface of the bowl 10, rests upon such surface the device is held against tipping with nipple 12 spaced above such surface as is evident by viewing Fig. 2 of the drawing. Furthermore, the lip 32 maintains the device in an upright position with the opening 22 facing upwardly. The joinder between handle 14 and the bowl 10 is still further reinforced by a plateau 34 formed on the upper surface 20 of the handle 14 next adjacent the opening 22 and merging with the bead 26.

The device may be used as a spoon or ladle in that the bowl 10 may be filled by dipping the same into a vessel containing the food, whereupon the handle 14 is normally held while the infant takes the nipple 12 in his mouth. By virtue of the reinforcement for handle 14 including rib 28, there is sufficient rigidity in the overall structure to permit dipping of the device into relatively thick soupy fluids. Furthermore, the slit 18 formed in the terminal end 16 of nipple 12, permits relatively rapid but restricted flow of the food from the bowl 10 through the nipple 12 and the slit form of orifice 18 in response to the simultaneous sucking and compression action of the infant. The form and disposition of slit 18 is such as to cause the same to open when the nipple 12 is compressed.

Molding or otherwise forming the entire feeding utensil from flexible material presents a simple and inexpensive method of manufacture and a device that is not only sanitary and easily cleaned, but which cannot be broken or damaged by the infant during use. It presents a transitional device between the conventional bottle and nipple and the later use of a spoon.

Having thus described the invention what is claimed as new and desired to be secured by Letters Patent is:

1. An infant feeding device molded entirely of flexible material and comprising a substantially spherical bowl provided with a handle and a tubular nipple having a substantially spherical, terminal end provided with an elongated slit therein defining a normally closed slot disposed to be opened when said terminal end of the nipple is compressed during use of the device, said slit being of sufficient dimension to permit relatively rapid but restricted flow of food from the bowl through the nipple, the handle and the nipple extending from the bowl in diametrically opposite directions, there being an opening in the bowl between the nipple and the handle adjacent the upper face of the latter, the nipple being below the opening.

2. An infant feeding device as set forth in claim 1 wherein the length of the slit is substantially equal to the diameter of said terminal end of the nipple.

3. An infant feeding device as set forth in claim 1 wherein said handle is a flat element incapable of supporting the weight of the bowl, nipple and food therein without flexing when held at the outer end thereof and combination reinforcing and stand structure for the handle comprising a transversely T-shaped rib having a transversely rectangular main body portion extending longitudinally of the handle and integral with the latter and the bowl for preventing flexing of the handle and a cross flange portion at the outer end of the main body portion adjacent the outer end of the handle, said flange portion having a flat, transversely extending surface away from the handle defining a support for the device when the latter is placed on a flat support.

References Cited in the file of this patent

UNITED STATES PATENTS

| | | |
|---|---|---|
| D. 24,197 | Nye | Apr. 16, 1895 |
| 107,419 | Spencer | Sept. 13, 1870 |
| 2,673,563 | Kwast | Mar. 30, 1954 |

FOREIGN PATENTS

| | | |
|---|---|---|
| 24,422 | Great Britain | 1895 |
| 271,670 | Great Britain | June 2, 1927 |